(12) United States Patent
Fujiwara

(10) Patent No.: US 10,789,379 B2
(45) Date of Patent: Sep. 29, 2020

(54) VEHICLE ONBOARD APPARATUS AND COMPUTER PROGRAM

(71) Applicant: DENSO CORPORATION, Kariya, Aichi-pref. (JP)

(72) Inventor: Shohei Fujiwara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 77 days.

(21) Appl. No.: 16/072,957

(22) PCT Filed: Jan. 12, 2017

(86) PCT No.: PCT/JP2017/000808
§ 371 (c)(1),
(2) Date: Jul. 26, 2018

(87) PCT Pub. No.: WO2017/130717
PCT Pub. Date: Aug. 3, 2017

(65) Prior Publication Data
US 2019/0034655 A1 Jan. 31, 2019

(30) Foreign Application Priority Data

Jan. 28, 2016 (JP) .................................. 2016-014388

(51) Int. Cl.
*G06F 21/62* (2013.01)
*B60R 16/023* (2006.01)
(Continued)

(52) U.S. Cl.
CPC ...... *G06F 21/6218* (2013.01); *B60R 16/0231* (2013.01); *G06F 16/162* (2019.01);
(Continued)

(58) Field of Classification Search
None
See application file for complete search history.

(56) References Cited

U.S. PATENT DOCUMENTS 8,140,358 B1 * 3/2012 Ling ..................... G06Q 40/08
705/4
8,922,332 B2 * 12/2014 Nakamachi ........ G05B 19/4188
340/3.32
(Continued)

FOREIGN PATENT DOCUMENTS

JP 2010254007 A 11/2010
JP 2014069599 A 4/2014

*Primary Examiner* — Thomas G Black
*Assistant Examiner* — Demetra R Smith-Stewart
(74) *Attorney, Agent, or Firm* — Harness, Dickey & Pierce, P.L.C.

(57) ABSTRACT

In a vehicle onboard apparatus, a connection detection function expands a specific file and activates an SSH connection function when a USB memory storing a specific file is connected, and thereby enables access to an application function from a general-purpose OS function during a period in which the USB memory is connected. A disconnection detection function stops the SSH connection function and deletes the SSH connection function when the USB memory is disconnected, and thereby disables access to the application function from the general-purpose OS function during a period in which the USB memory is not connected.

12 Claims, 13 Drawing Sheets

(51) Int. Cl.
*H04L 29/06* (2006.01)
*G06F 21/12* (2013.01)
*H04W 4/48* (2018.01)
*G06F 16/16* (2019.01)

(52) U.S. Cl.
CPC .............. *G06F 21/12* (2013.01); *G06F 21/62* (2013.01); *G06F 21/629* (2013.01); *H04L 63/083* (2013.01); *H04W 4/48* (2018.02)

(56) References Cited

U.S. PATENT DOCUMENTS

| | | | |
|---|---|---|---|
| 2012/0194679 A1* | 8/2012 | Nehowig | G06F 1/1626 348/148 |
| 2014/0046569 A1* | 2/2014 | Mohn | G08G 1/00 701/99 |
| 2014/0257828 A1* | 9/2014 | Thornley | G06F 11/00 705/2 |

* cited by examiner

VEHICLE ONBOARD APPARATUS AND COMPUTER PROGRAM

CROSS REFERENCE TO RELATED APPLICATIONS

This application is a U.S. National Phase Application under 35 U.S.C. 371 of International Application No. PCT/JP2017/000808 filed on Jan. 12, 2017 and published in Japanese as WO 2017/130717 A1 on Aug. 3, 2017. This application is based on and claims the benefit of priority from Japanese Patent Application No. 2016-014388 filed on Jan. 28, 2016. The entire disclosures of all of the above applications are incorporated herein by reference.

TECHNICAL FIELD

The present disclosure relates to a vehicle onboard apparatus and a computer program.

BACKGROUND ART

A microcomputer of a vehicle onboard apparatus including a navigation system or an IVI (In-Vehicle Infotainment) system is equipped with a general-purpose operating system (hereinafter referred to as OS (Operating System)) function and an application function for storing logs and data. In general, this type of vehicle onboard apparatus is attached to a vehicle in an unremovable manner. Therefore, when a failure occurs in the market, an analysis tool for performing log analysis and data analysis is connected to the vehicle onboard apparatus, a data communication function mounted in the general-purpose OS function is activated, and logs and data are transferred from the vehicle onboard apparatus to the analysis tool.

In the configuration adopting an SSH (Secure Shell) connection function as the data communication function mounted in the general-purpose OS, the SSH connection function performs authentication with a password, and hence a certain level of security can be ensured. However, due to leakage or analysis of the password, fraudulent acts to perform vehicle control by accessing the vehicle onboard apparatus in an unauthorized manner from the outside are becoming obvious, and there is a difficulty where the security cannot be sufficiently ensured. On the other hand, when the SSH connection function is deleted so as to sufficiently ensure the security, it becomes impossible to transfer logs and data from the vehicle onboard apparatus to the analysis tool, to cause a difficulty where the log analysis or the data analysis cannot be performed at the time of occurrence of a defect in the market. Accordingly, it has been desired to achieve both ensuring the security and executing the log analysis and the data analysis at the time of occurrence of a defect in the market.

For example, Patent Literature 1 discloses a technique for preventing unauthorized access from the outside to the vehicle onboard apparatus. Further, for example, Patent Literature 2 discloses a technique for ensuring the security when the vehicle onboard apparatus is detached from the vehicle.

PRIOR ART LITERATURES

Patent Literatures

Patent Literature 1: JP 2014-69599 A
Patent Literature 2: JP 2010-254007 A

SUMMARY OF INVENTION

With any of the techniques disclosed in Patent Literatures 1 and 2, it is difficult to achieve both ensuring the security and executing the log analysis and data analysis at the time of occurrence of a failure in the market.

It is an object of the present disclosure to provide a vehicle onboard apparatus and a computer program capable of appropriately achieving both ensuring security and executing log analysis and data analysis at the time of occurrence of a defect in the market.

According to the first aspect of the present disclosure, when the connection detection function detects connection of the recording medium to the recording medium connection portion and determines that a specific file protected by a password is stored in the recording medium, the connection detection function expands a specific file by using a predefined password, copies the data communication function to a specific area of the general-purpose operating system function, and activates the data communication function. When the disconnection detection function detects disconnection of the recording medium from the recording medium connection portion and determines that the data communication function has been activated, the disconnection detection function stops the activated data communication function and deletes the data communication function from the general-purpose operating system function.

That is, when the recording medium storing the specific file is connected, the specific file is expanded and the data communication function is activated to enable access from the general-purpose operating system function to the application function during a period when the recording medium is connected. Hence, it is possible to transfer logs and data from the vehicle onboard apparatus to the analysis tool and to perform log analysis and data analysis. When the recording medium is disconnected, the activated data communication function is stopped and deleted to disable access from the general-purpose operating system function to the application function during a period when the recording medium is not connected. It is thereby possible to prevent unauthorized access to the application function from the outside and to ensure the security. As described above, it is possible to appropriately achieve both ensuring the security and executing the log analysis and the data analysis at the time of occurrence of a defect in the market.

According to the second aspect of the present disclosure, when the connection detection function detects connection of the recording medium to the recording medium connection portion and determines that a first specific file is stored in the recording medium, the connection detection function acquires a second specific file protected by a password from an external server, expands the acquired second specific file by using a predefined password, copies the data communication function to a specific area of the general-purpose operating system function, and activates the data communication function. When the disconnection detection function detects disconnection of the recording medium from the recording medium connection portion and determines that the data communication function has been activated, the disconnection detection function stops the activated data communication function and deletes the data communication function from the general-purpose operating system function.

That is, when the recording medium storing a first specific file is connected, a second specific file is acquired from the external server, the second specific file is expanded, and the data communication function is activated, to enable access from the general-purpose operating system function to the application function during a period when the recording medium is connected. Hence, it is possible to transfer logs and data from the vehicle onboard apparatus to the analysis tool and to perform log analysis and data analysis. When the recording medium is disconnected, the activated data communication function is stopped and deleted to disable access from the general-purpose operating system function to the application function during a period when the recording medium is not connected. It is thereby possible to prevent unauthorized access to the application function from the outside and to ensure the security. As above, it is possible to obtain a similar effect to that of the first aspect described above, and to appropriately achieve both ensuring the security and executing the log analysis and the data analysis at the time of occurrence of a defect in the market.

BRIEF DESCRIPTION OF DRAWINGS

These and other objects, features and advantages of the present disclosure will become more apparent from the following detailed description with reference to the accompanying drawings. In the drawing.

DESCRIPTION OF EMBODIMENTS

First Embodiment

Figure 1:
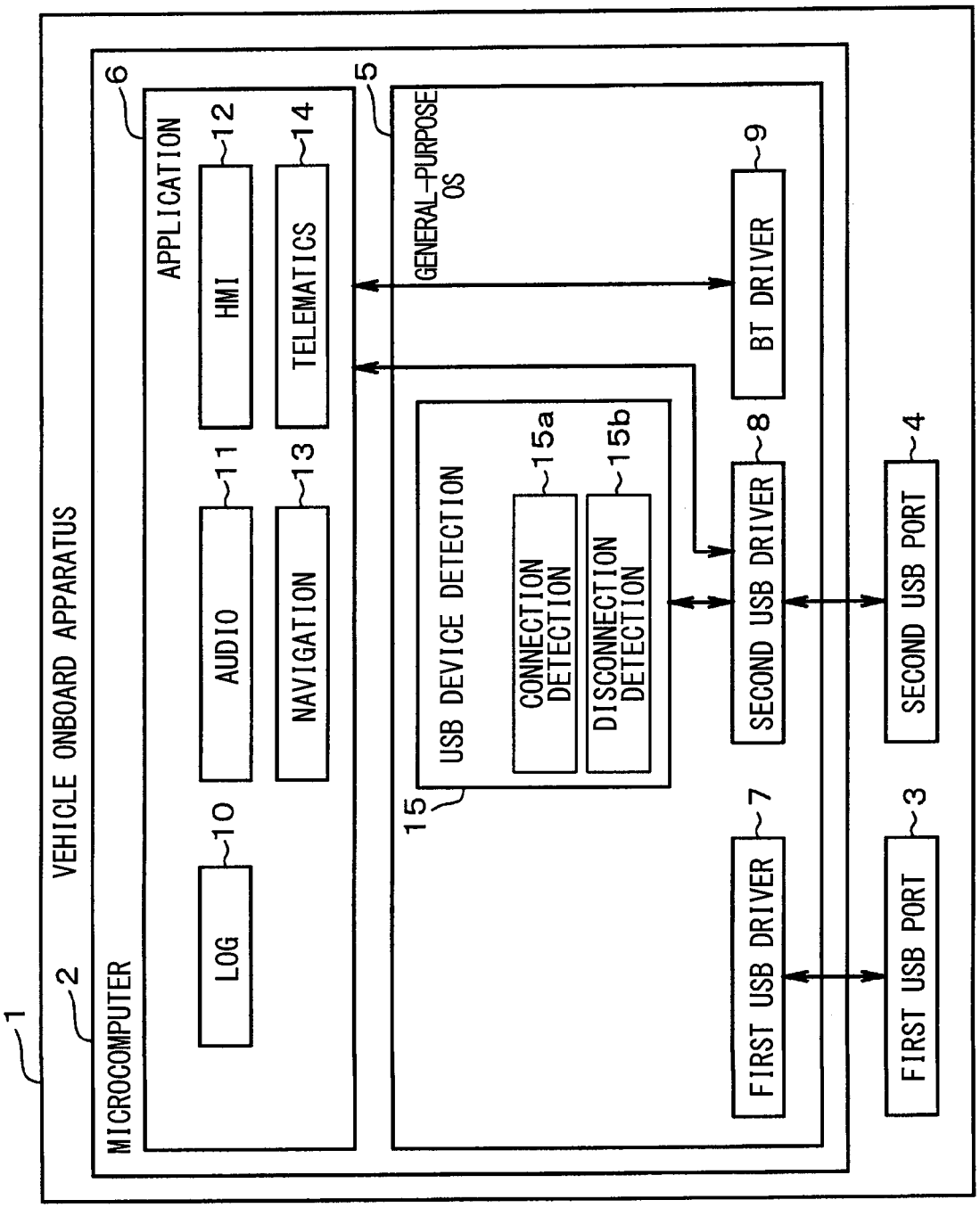
FIG. 1 is a functional block diagram showing a first embodiment and showing a configuration of a vehicle onboard apparatus.

Hereinafter, a first embodiment will be described with reference to FIGS. 1 to 6. A vehicle onboard apparatus 1 is, for example, apparatus including a navigation system or an IVI system, and includes a microcomputer 2, a first USB port 3 (corresponding to an analysis tool connection portion), and a second USB port 4 (corresponding to a recording medium connection portion). The microcomputer 2 executes a computer program stored in a non-transitional tangible recording medium to execute a process corresponding to the computer program, and controls the overall operation of the vehicle onboard apparatus 1. The microcomputer 2 is equipped with a general-purpose operating system (hereinafter referred to as OS) function 5 and an application function 6 as a software configuration. The function means a module that executes a specific program.

The general-purpose OS function 5 includes a first USB driver 7, a second USB driver 8, and a Bluetooth (registered trademark, hereinafter referred to as BT) driver 9. In a state where a USB device (not shown) having a USB communication function is connected to the first USB port 3, the first USB driver 7 performs data communication compliant with the USB communication protocol with the USB device. In a state where a USB device (not shown) having a USB communication function is connected to the second USB port 4, the second USB driver 8 performs data communication compliant with the USB communication protocol with the USB device. When a BT device (not shown) having the BT communication function registered beforehand exists in a communication zone where the BT communication is possible and the authentication is established with the BT device, the BT driver 9 performs data communication, conforming to the BT communication protocol, with the BT device.

The application function 6 has a log function 10, an audio function 11, an HMI (Human Machine Interface) function 12, a navigation function 13, and a telematics function 14. The log function 10 manages a log showing an operation history of the vehicle onboard apparatus 1. The audio function 11, the HMI function 12, the navigation function 13, and the telematics function 14 manage pieces of data of audio control, HMI control, navigation control, and telematics control, respectively.

The general-purpose OS function 5 has a USB device detection function 15 in addition to the USB drivers 7 and 8, and the BT driver 9 described above. The USB device detection function 15 has a connection detection function 15a and a disconnection detection function 15b. When detecting the connection of the USB device to the second USB port 4, the connection detection function 15a performs a USB connection detection process described later. When detecting the disconnection of the USB device from the second USB port 4, the disconnection detection function 15b performs a USB disconnection detection process described later.

As described in BACKGROUND ART above, in the configuration in which the SSH connection function is mounted as the data communication function in the general-purpose OS function, there is a problem where the security cannot be sufficiently ensured due to leakage or analysis of a password, and meanwhile, in the configuration in which the SSH connection function is deleted from the general-purpose OS function, there is a problem where the log analysis or the data analysis cannot be performed at the time of occurrence of a defect in the market. Regarding this respect, in the present embodiment, the following configuration is adopted.

Figure 2:
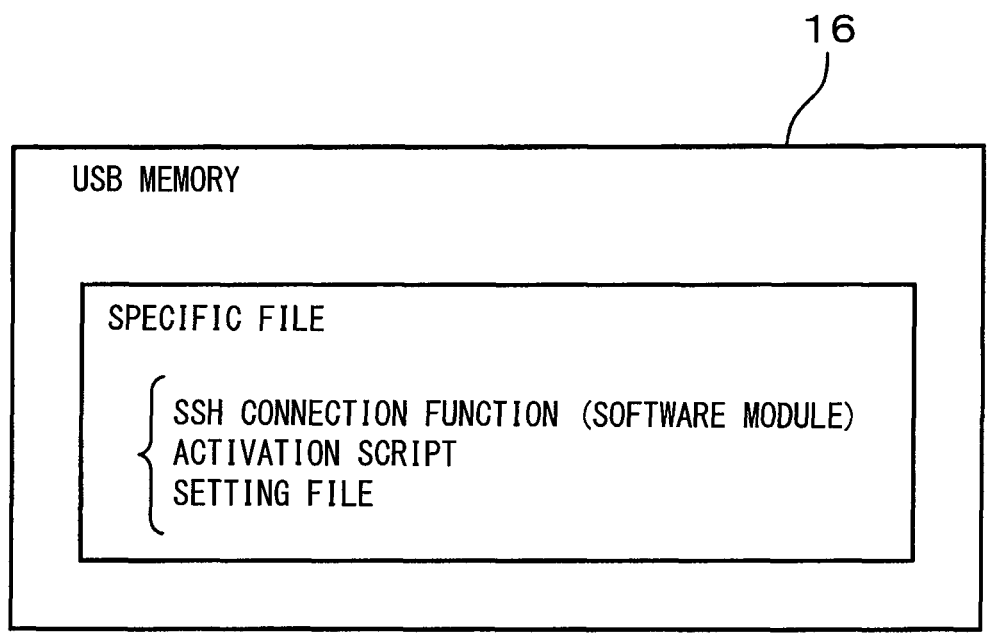
FIG. 2 is a diagram showing information stored in a USB memory.
Figure 3:
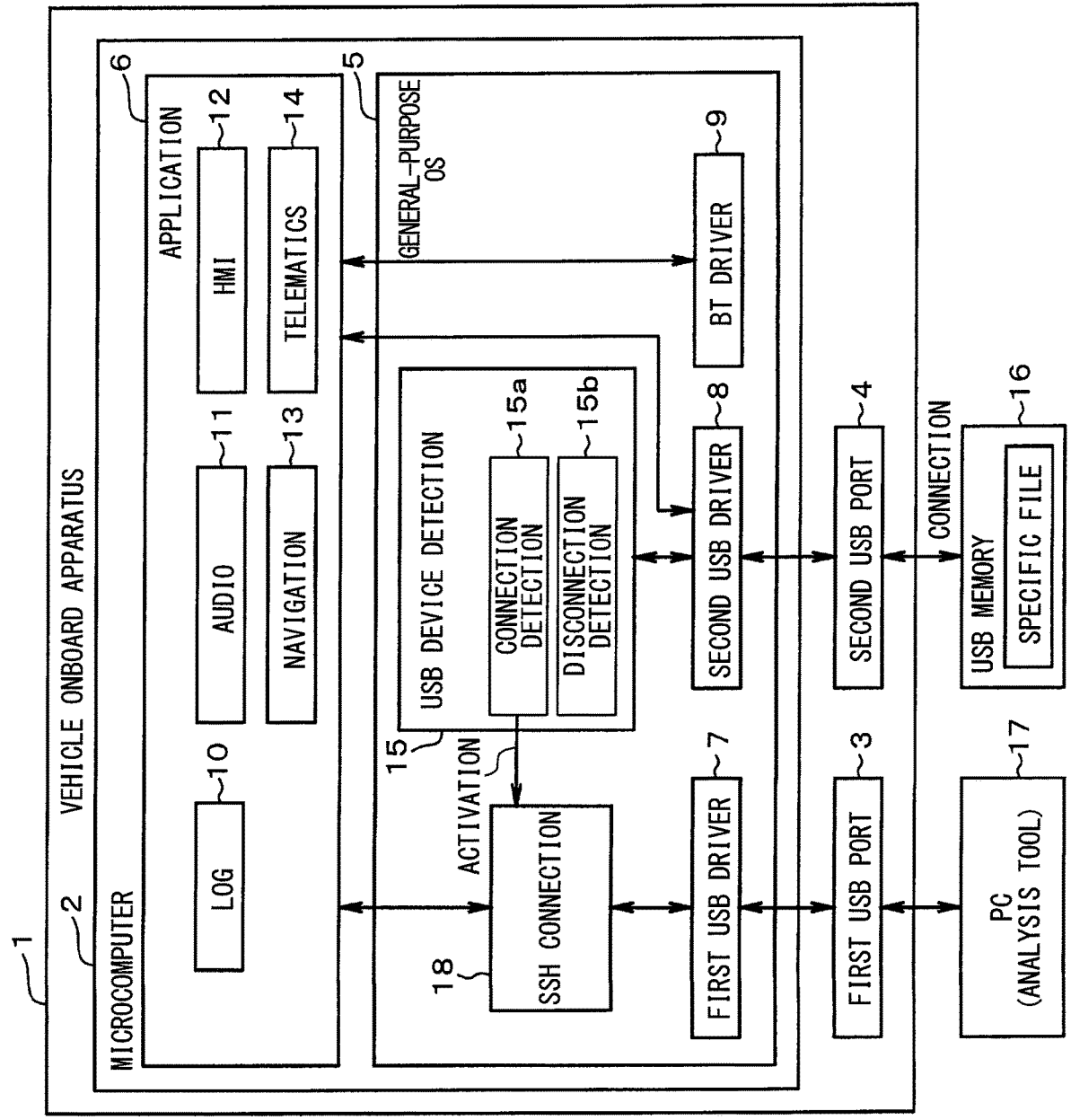
FIG. 3 is a diagram showing a mode at a time when the USB memory is connected.
Figure 4:
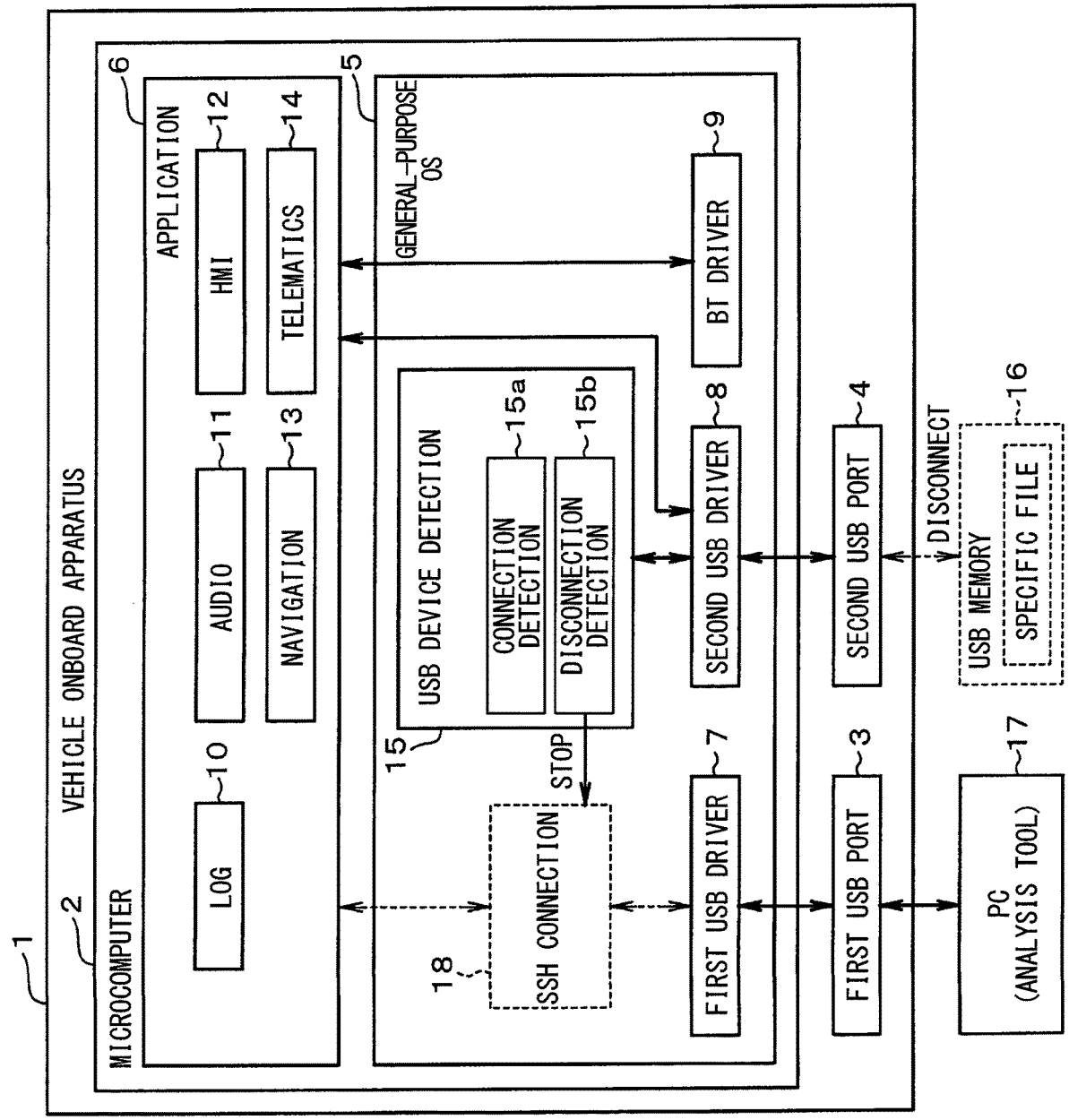
FIG. 4 is a diagram showing a mode at a time when USB memory is disconnected.

As shown in FIG. 2, a USB memory 16 (corresponding to the recording medium) storing a specific file with a specific file name is prepared. The specific file is protected with a password and includes an SSH connection function made up of a software module, an activation script for activating the SSH connection function, and a setting file for executing the SSH connection function. As a usage form of the USB memory 16, when it becomes necessary to perform log analysis and data analysis due to occurrence of a defect in the market, as shown in FIG. 3, for example, an analysis tool 17 made up of a personal computer is connected to the first USB port 3 via a USB cable (not shown), and the USB memory 16 described above is connected to the second USB port 4. Then, when the log analysis and the data analysis are completed, as shown in FIG. 4, the connected USB memory 16 is disconnected from the second USB port 4. As a mode to connect the USB memory 16 to the second USB port 4, the USB memory 16 may be inserted into the second USB port 4 (i.e., not via the USB cable), or the USB memory 16 may be connected to the second USB port 4 via the USB cable.

Figure 5:
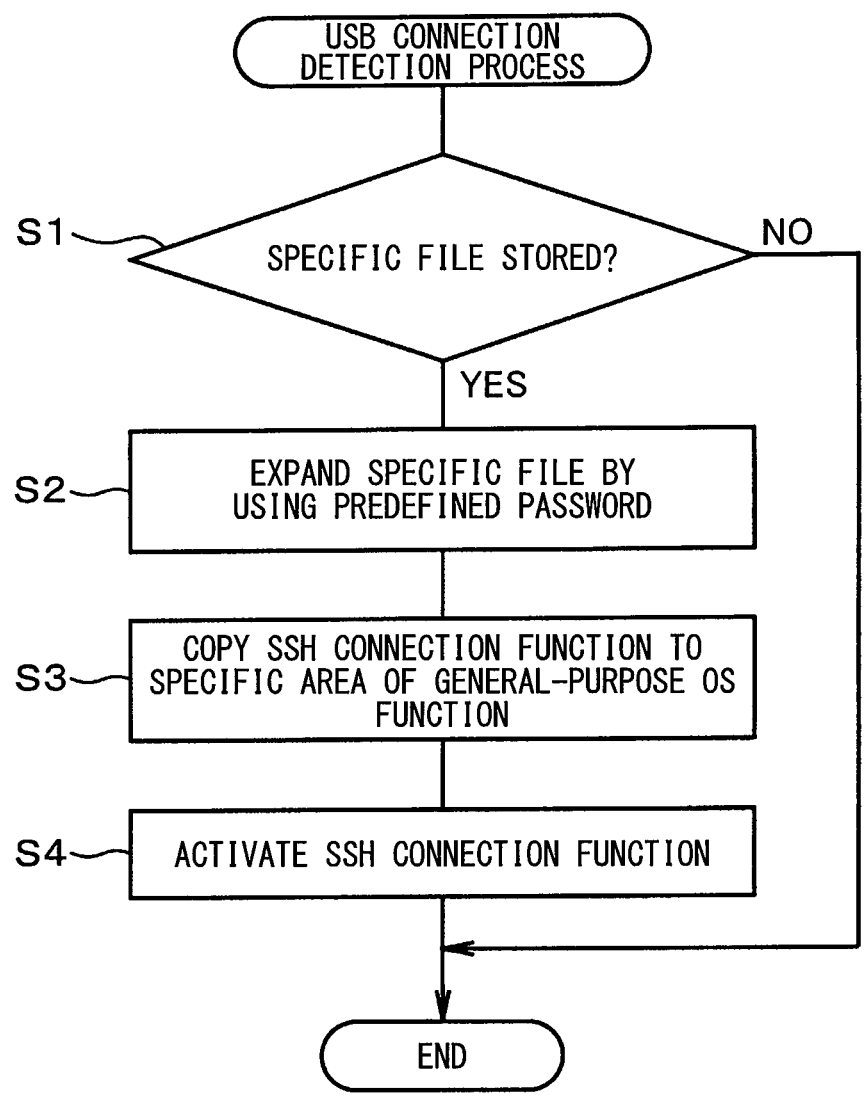
FIG. 5 is a flowchart showing a USB connection detection process.
Figure 6:
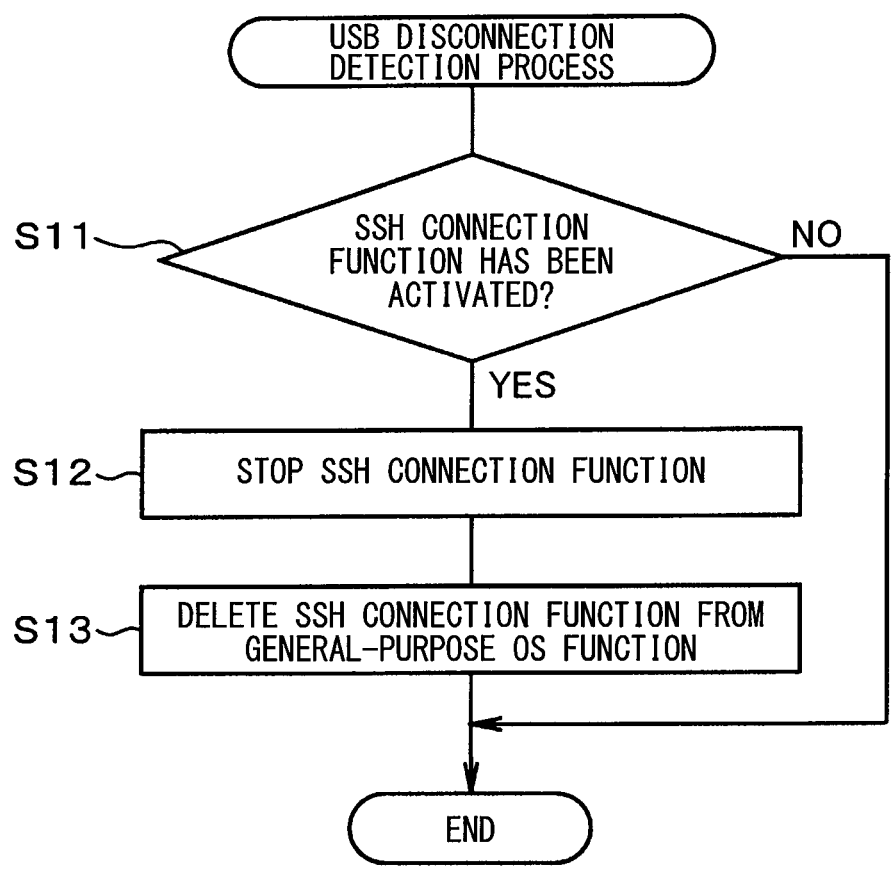
FIG. 6 is a flowchart showing a USB disconnection detection process.

Next, the function of the above configuration will be described with reference to FIGS. 5 and 6. Here, a description will be given of the USB connection detection process that is performed when the connection detection function 15*a* detects connection of the USB device to the second USB port 4, and the USB disconnection detection process that is performed when the disconnection detection function 15*b* detects the disconnection of the USB device from the second USB port 4.

(1) USB Connection Detection Process

When the connection detection function 15*a* detects connection of the USB device to the second USB port 4 and activates the USB connection detection process, the connection detection function 15*a* determines whether a specific file is stored in the USB device (S1, corresponding to the storage determination step). Here, when the USB device other than the USB memory 16 described above is connected to the second USB port 4, the connection detection function 15*a* determines that a specific file is not stored in the USB device (S1: NO), to terminate the USB connection detection process.

On the other hand, when the USB memory 16 described above is inserted into the second USB port 4 and connected, the connection detection function 15*a* determines that a specific file is stored in the USB memory 16 (S1: YES), and the specific file is expanded using a predefined password (S2, corresponding to the expansion step). Then, the connection detection function 15*a* copies an SSH connection function 18 to a specific area of the general-purpose OS function 5 (S3, corresponding to the copying step) and activates the SSH connection function 18 (S4, corresponding to the activation step), to terminate the USB connection detection process.

That is, when detecting the connection of the USB memory 16 to the second USB port 4, the microcomputer 2 expands a specific file, copies the SSH connection function 18 to a specific area of the general-purpose OS function 5, and activates the SSH connection function 18 to enable access from the general-purpose OS function 5 to the application function 6. As a result, data communication can be performed between the analysis tool 17 connected to the first USB port 3 and the microcomputer 2, and logs and data stored in the application function 6 can be transferred to the analysis tool 17.

(2) USB Disconnection Detection Process

The disconnection detection function 15*b* detects the disconnection of the USB device from the second USB port 4, and upon start of the USB disconnection detection process, the disconnection detection function 15*b* determines whether the SSH connection function 18 has been activated (S11, activation determination step). Here, when the USB device other than the USB memory 16 described above is disconnected from the second USB port 4, the disconnection detection function 15*b* determines that the SSH connection function 18 has not been activated (S11, NO), to terminate the USB disconnection detection process.

On the other hand, when the USB memory 16 described above is removed from the second USB port 4 and disconnected, the disconnection detection function 15*b* determines that the SSH connection function 18 has been activated (S11, YES) and stops the activated SSH connection function 18 (S12, corresponding to the stopping step). Then, the disconnection detection function 15*b* deletes the SSH connection function 18 from the general-purpose OS function 5 (S13), to terminate the USB disconnection detection process.

That is, when detecting the disconnection of the USB memory 16 from the second USB port 4, the microcomputer 2 stops the SSH connection function 18 and deletes the SSH connection function 18 from the general-purpose OS function 5 to disable access from the general-purpose OS function 5 to the application function 6. It is possible to prevent unauthorized access to the vehicle onboard apparatus 1 from the outside.

As described above, according to the first embodiment, the following effects can be obtained.

When the USB memory 16 is connected in the vehicle onboard apparatus 1, by deploying a specific file and activating the SSH connection function 18, it is possible to access the application function 6 from the general-purpose OS function 5 during the period when the USB memory 16 is connected. Hence, it is possible to transfer logs and data from the vehicle onboard apparatus 1 to the analysis tool 17 and to perform the log analysis and the data analysis. When the USB memory 16 is disconnected, the SSH connection function 18 is stopped and deleted to disable access from the general-purpose OS function 5 to the application function 6 during a period when the USB memory 16 is not connected. It is thereby possible to prevent unauthorized access to the vehicle onboard apparatus 1 from the outside and to ensure the security. As described above, it is possible to appropriately achieve both ensuring the security and executing the log analysis and the data analysis at the time of occurrence of a defect in the market.

Second Embodiment

Figure 7:
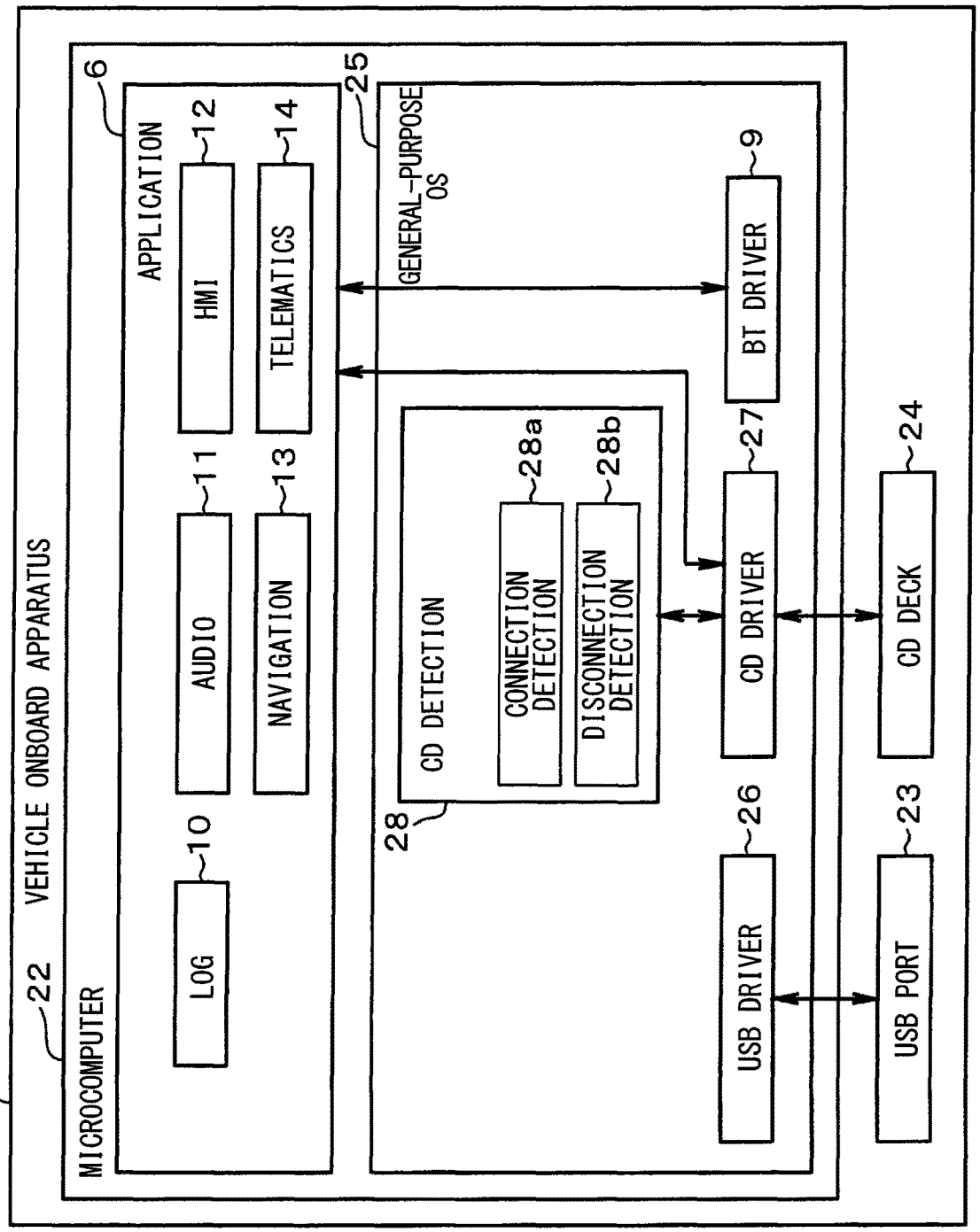
FIG. 7 is a functional block diagram showing a second embodiment and showing a configuration of a vehicle onboard apparatus.
Figure 8:
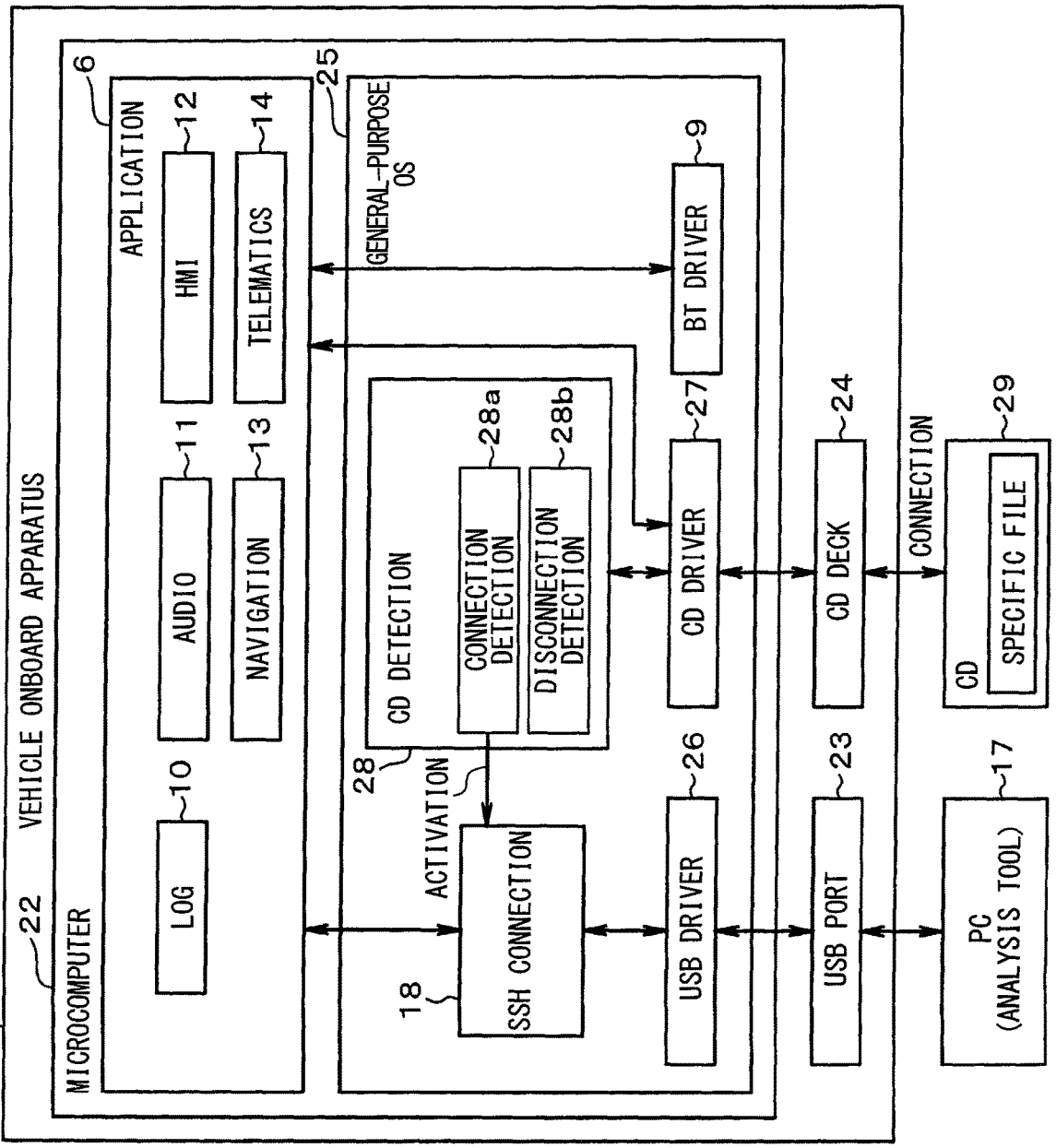
FIG. 8 is a diagram showing a mode at a time when a CD is connected.
Figure 9:
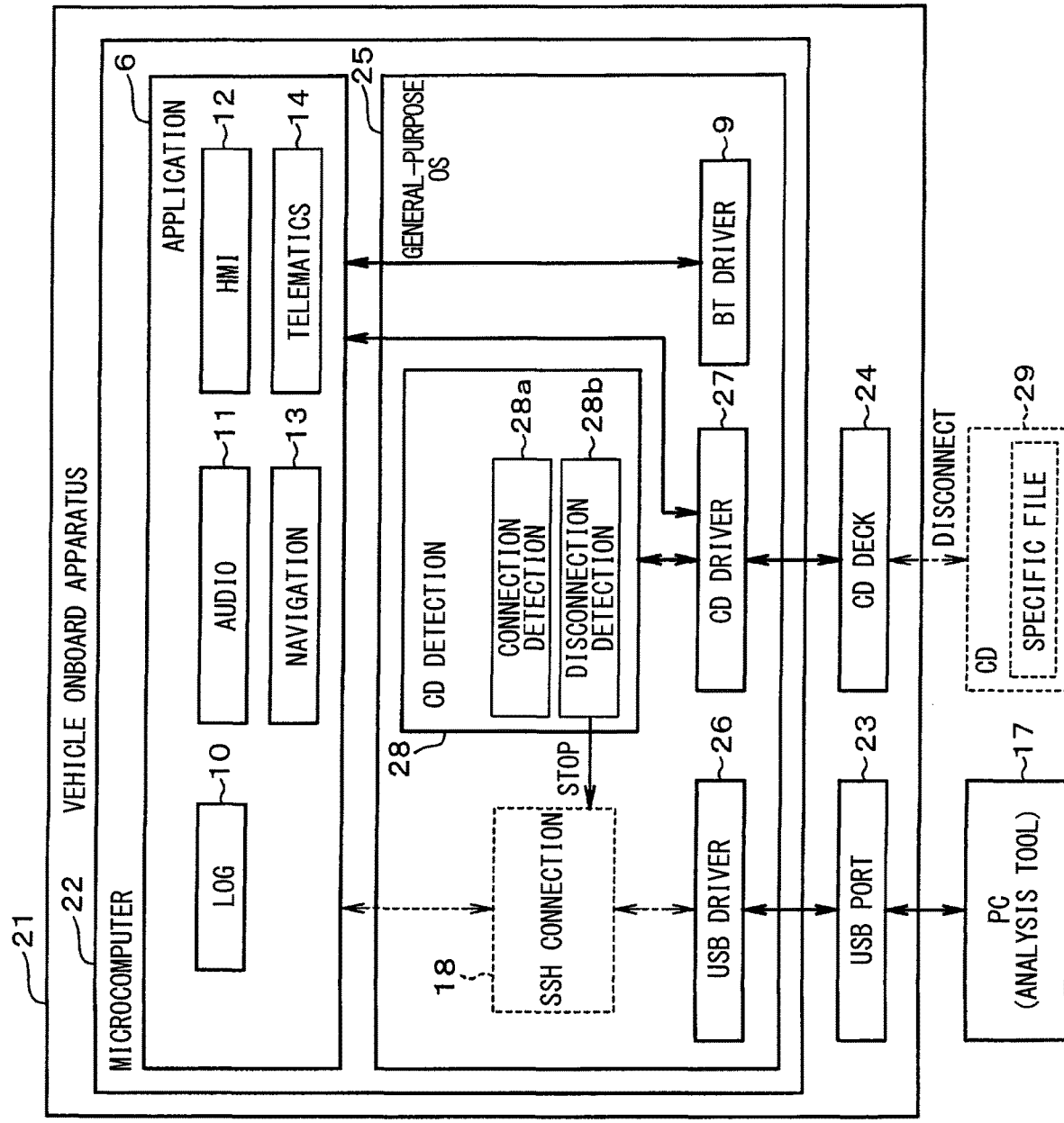
FIG. 9 is a diagram showing a mode at a time when the CD is disconnected.

Next, a second embodiment will be described with reference to FIGS. 7 to 9. The description of the same parts as those of the first embodiment described above will be omitted, and different parts will be described. While the first embodiment has a configuration where the SSH connection function 18 is activated using the USB memory 16 that stores a specific file, the second embodiment has a configuration where the SSH connection function 18 is activated using a compact disk (registered trademark, hereinafter referred to as CD, corresponding to the disk-type recording medium) that stores a specific file.

The vehicle onboard apparatus 21 includes a microcomputer 22, a USB port 23 (corresponding to the analysis tool connection portion), and a CD deck 24 (corresponding to the recording medium connection portion). The microcomputer 22 is similar to the microcomputer 2 described in the first embodiment, and equipped with a general-purpose OS function 25 and the application function 6 as a software configuration. The general-purpose OS function 25 includes a USB driver 26, a CD driver 27, and the BT driver 9 described in the first embodiment. In a state where a USB device (not shown) having a USB communication function is connected to the USB port 23, the USB driver 26 performs data communication compliant with the USB communication protocol with the USB device. In a state where a CD (not shown) is connected to the CD deck 24, the CD driver 27 reads data recorded on the CD. The general-purpose OS function 25 has a CD detection function 28. The CD detection function 28 is similar to the USB device detection function 15 described in the first embodiment, and has a connection detection function 28a and a disconnection detection function 28b. When detecting the connection of the CD to the CD deck 24, the connection detection function 28a performs a similar process to the USB connection detection process described in the first embodiment. When detecting the disconnection of the CD from the CD deck 24, the disconnection detection function 28b performs a similar process to the USB disconnection detection process described in the first embodiment.

In this case, similarly to the USB memory 16 described in the first embodiment, a CD 29 (corresponding to the recording medium) storing a specific file with a specific file name is prepared. As shown in FIG. 8, when detecting insertion of the CD 29 into the CD deck 24 and detecting connection of the CD 29 to the CD deck 24, the microcomputer 22 expands a specific file, copies the SSH connection function 18 to a specific area of the general-purpose OS function 25, and activates the SSH connection function 18 to enable access from the general-purpose OS function 25 to the application function 6. As shown in FIG. 9, when detecting removal of the CD 29 from the CD deck 24 and detecting the disconnection of the CD 29 from the CD deck 24, the microcomputer 22 stops the SSH connection function 18 and deletes the SSH connection function 18 from the general-purpose OS function 25 to disable access from the general-purpose OS function 25 to the application function 6.

As described above, according to the second embodiment, even when the CD 29 is used instead of the USB memory 16 as the recording medium that stores the specific file, it is possible to obtain a similar effect to that of the first embodiment described above, and to appropriately achieve both ensuring the security and executing the log analysis and the data analysis at the time of occurrence of a defect in the market.

Third Embodiment

Next, a third embodiment will be described with reference to FIG. 10 to FIG. 14. The description of the same parts as those of the first embodiment described above will be omitted, and different parts will be described. While the first embodiment has a configuration where a specific file including the SSH connection function, the activation script, and the setting file is stored in the USB memory 16, the third embodiment has a configuration where the specific file including the SSH connection function, the activation script, and the setting file is managed by an external server.

Figure 10:
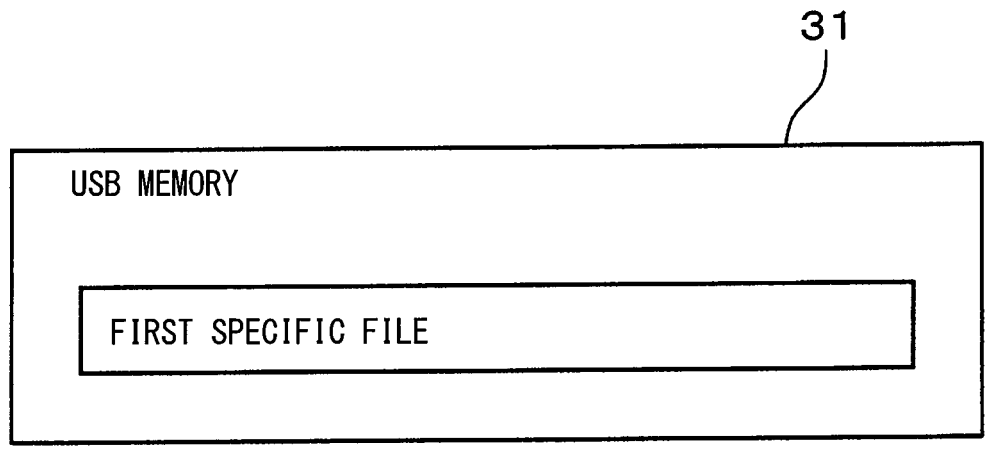
FIG. 10 is a diagram showing a third embodiment and showing information stored in a USB memory.
Figure 11:
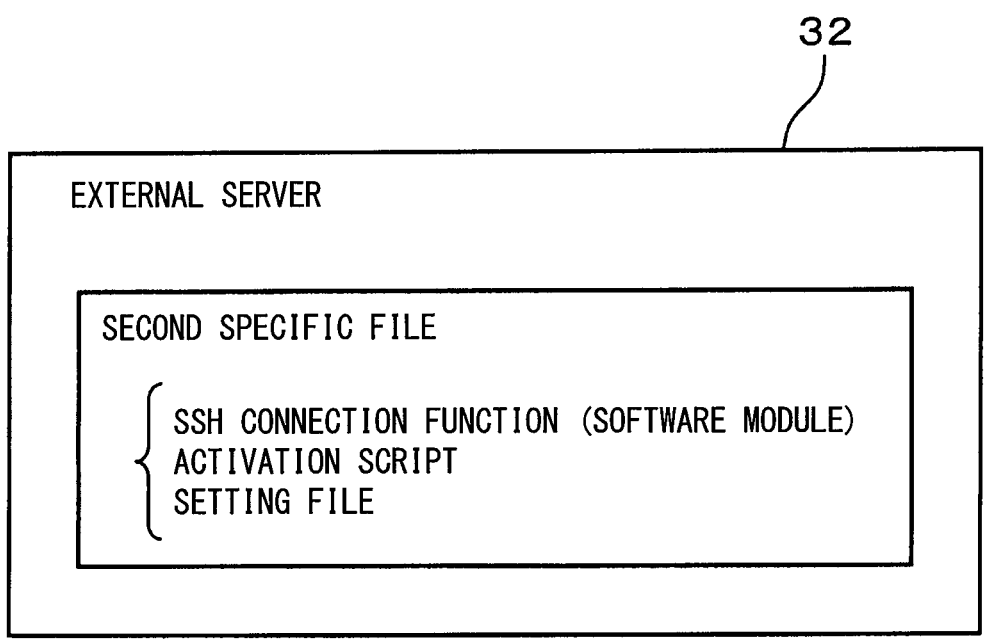
FIG. 11 is a diagram showing information stored in an external server.

In this case, unlike the USB memory 16 described in the first embodiment, as shown in FIG. 10, a USB memory 31 (corresponding to the recording medium) storing a first specific file with a first specific file name is prepared. Unlike the specific file stored in the USB memory 16 described in the first embodiment, the first specific file is not protected by a password and does not include an SSH connection function, an activation script, or a setting file. On the other hand, as shown in FIG. 11, a second specific file with a second specific file name is stored in an external server 32. The second specific file is similar to the specific file stored in the USB memory 16, protected by a password, and includes an SSH connection function, an activation script, and a setting file.

Figure 12:
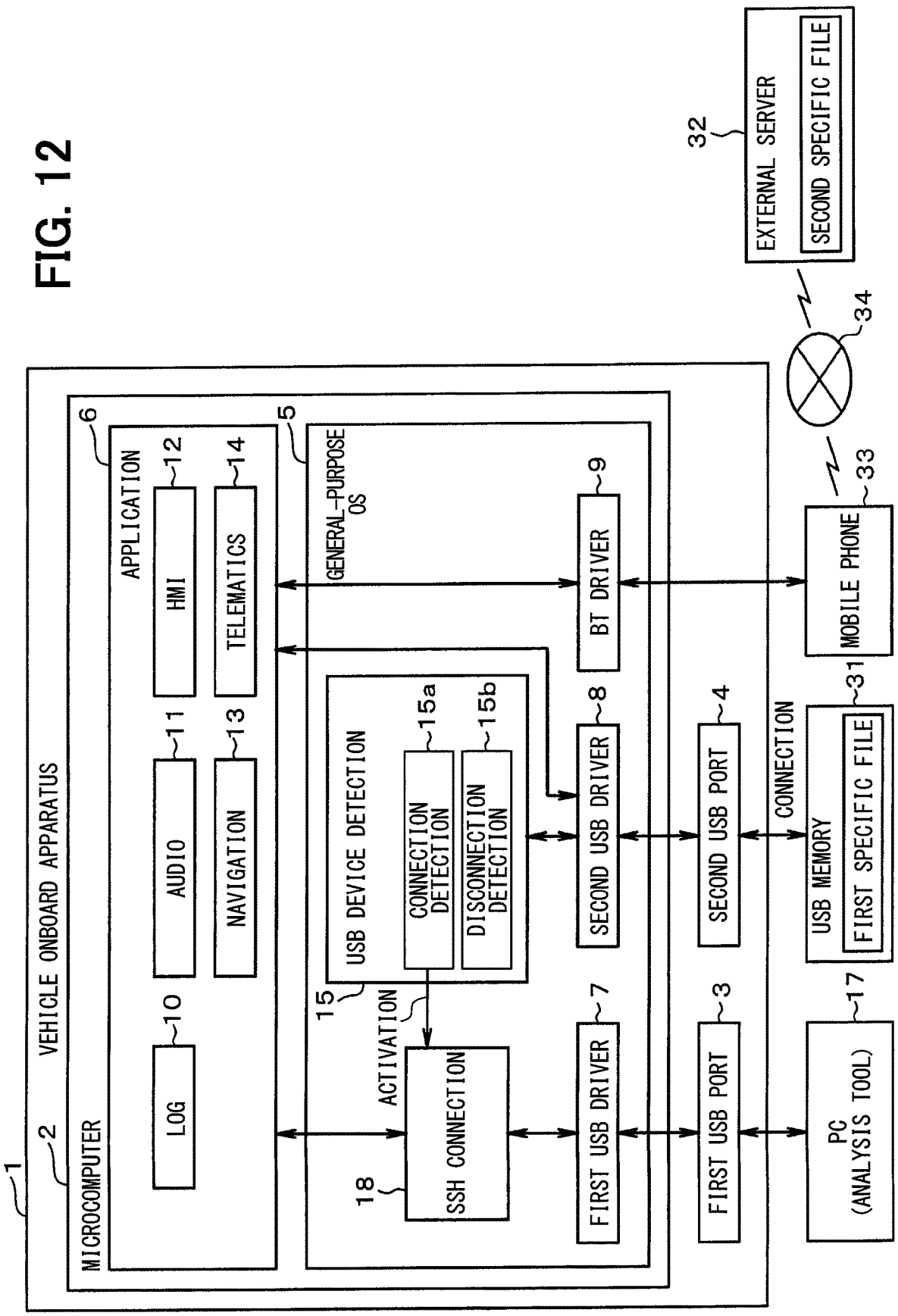
FIG. 12 is a diagram showing a mode at a time when the USB memory is connected.
Figure 13:
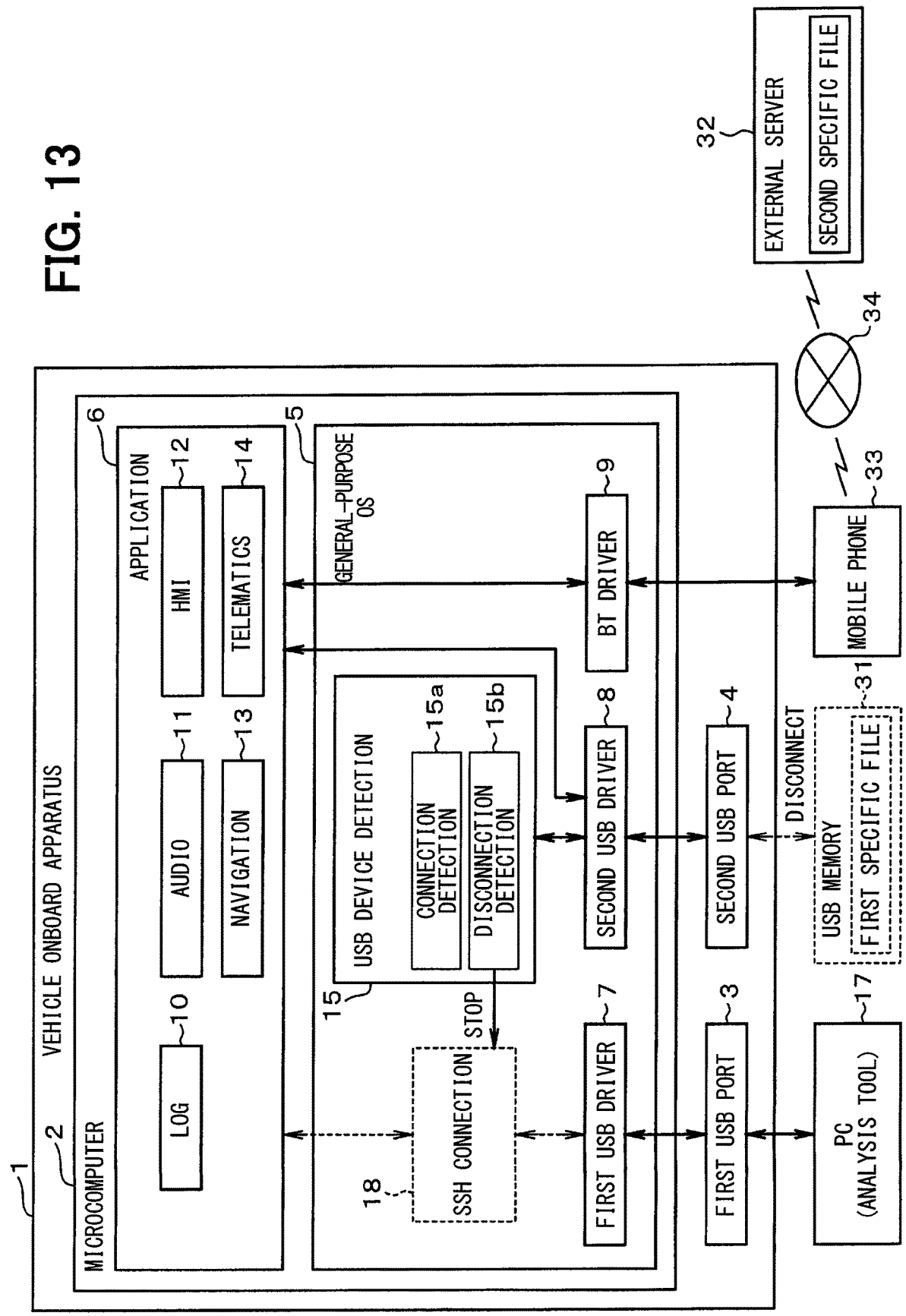
FIG. 13 is a diagram showing a mode at a time when the USB memory is disconnected.
Figure 14:
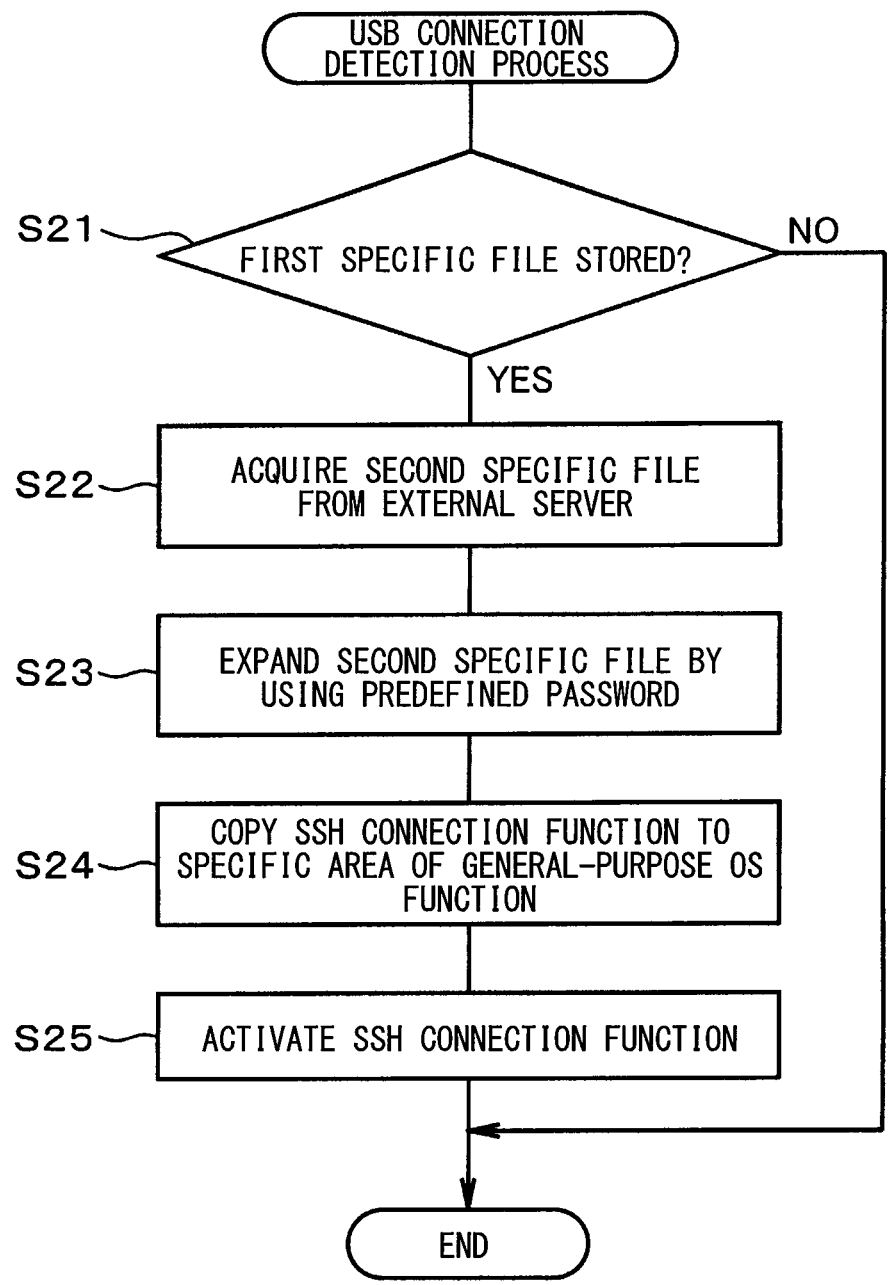
FIG. 14 is a flowchart showing a USB connection detection process.

In this case, when it becomes necessary to perform log analysis and data analysis due to occurrence of a defect in the market, as shown in FIG. 12, in addition to connection of the analysis tool 17 to the first USB port 3 via the USB cable (not shown) and connection of the USB memory 31 described above to the second USB port 4, a cellular phone 33 having a BT function as a communication device for performing data communication with the external server 32 is connected so as to be able to perform BT communication. Then, when the log analysis and data analysis are completed, as shown in FIG. 13, the connected USB memory 31 is disconnected from the second USB port 4.

When the USB memory 31 is inserted into the second USB port 4 and connected, the connection detection function 15a determines that the first specific file is stored in the USB memory 31 (S21: YES), activates the telematics function 14, connects the cellular phone 33 to the external server 32 via the communication network 34, and acquires the second specific file from the external server 32 (S22, corresponding to the acquisition step). Next, the connection detection function 15a expands the second specific file by using a predefined password (S23, corresponding to the expansion step). Thereafter, similarly to the first embodiment, the connection detection function 15a copies the SSH connection function 18 to a specific area of the general-purpose OS function 5 (S24, corresponding to the copying step), activates the SSH connection function 18 (S25, corresponding to the activation step), to complete the USB connection detection process.

That is, when detecting the connection of the USB memory 31 to the second USB port 4, the microcomputer 2 acquires the second specific file from the external server 32, expands the acquired second specific file, copies the SSH connection function 18 to a specific area of the general-purpose OS function 5, and activates the SSH connection function 18 to enable access from the general-purpose OS function 5 to the application function 6. Thereafter, when the USB memory 31 is removed from the second USB port 4 and disconnected, as in the case described in the first embodiment, the disconnection detection function 15b stops the activated SSH connection function 18 and deletes the SSH connection function 18 from the general-purpose OS function 5.

As described above, according to the third embodiment, even when the second specific file similar to the specific file stored in the USB memory 16 is managed by the external server 32, it is possible to obtain a similar effect to that of the first embodiment described above, and to appropriately achieve both ensuring the security and executing the log analysis and the data analysis at the time of occurrence of a defect in the market. As compared with the first embodiment using the USB memory 16 which could be lost or stolen, by the external server 32 managing the second specific file, the possibility that the USB memory 16 is lost or stolen can be removed and the security can be ensured firmly. In addition, even when upgrading the version of the second specific file by improving functions, for example, it is possible to flexibly deal with it.

Other Embodiments

Although the present disclosure has been described in accordance with the embodiments, it is understood that the present disclosure is not limited to the embodiments and structures. The present disclosure encompasses various modifications and variations within the similar scope. In addition, various combinations and forms, as well as other combinations and forms including only one element, more than that, or less than that, are also within the scope and idea of the present disclosure.

The configuration has been exemplified where the second specific file is acquired from the external server 32 by connection of the USB memory 31 storing the first specific file, but a configuration may be formed where the second specific file is acquired from the external server 32 by connection of a CD storing the first specific file.

The configuration has been exemplified where the vehicle onboard apparatus 1 performs data communication with the cellular phone 33 by BT communication, but a configuration may be formed where the vehicle onboard apparatus 1 performs data communication with the cellular phone 33 by wireless communication via BLE (Bluetooth Low Energy), WiFi (Wireless Fidelity)(registered trademark) or the like to acquire the second specific file from the external server 32. Alternatively, a configuration may be formed where the vehicle onboard apparatus 1 performs data communication with the cellular phone 33 by wired communication to acquire the second specific file from the external server 32.

What is claimed is:

1. A vehicle onboard apparatus comprising:
    an analysis tool connection portion to which an analysis tool that analyzes logs and data is connectable;
    a recording medium connection portion to which a recording medium is connectable; and
    a microcomputer having a general-purpose operating system function capable of activating a data communication function that transfers the logs and the data stored in an application function to the analysis tool,
    wherein:
    the vehicle onboard apparatus comprises
        a connection detection function that detects connection of the recording medium to the recording medium connection portion, and
        a disconnection detection function that detects disconnection of the recording medium from the recording medium connection portion;
    when the connection detection function detects the connection of the recording medium to the recording medium connection portion and determines that a specific file protected by a password is stored in the recording medium, the connection detection function expands the specific file by using a predefined password, copies the data communication function included in the expanded specific file to a specific area of the general-purpose operating system function, and activates the data communication function; and
    when the disconnection detection function detects the disconnection of the recording medium from the recording medium connection portion and determines that the data communication function is activated, the disconnection detection function stops the data communication function activated and deletes the data communication function from the general-purpose operating system function.

2. The vehicle onboard apparatus according to claim 1, wherein:
    the recording medium connection portion includes a USB connection portion to which a USB memory as the recording medium is connectable.

3. The vehicle onboard apparatus according to claim 1, wherein:
    the recording medium connection portion includes a disk-type recording medium connection portion to which a disk-type recording medium as the recording medium is connectable.

4. The vehicle onboard apparatus according to claim 1, wherein:
    the vehicle onboard apparatus is attached to a vehicle in an unremovable manner.

5. The vehicle onboard apparatus according to claim 1, wherein:
    the general-purpose operating system function is configured to transfer the logs and the data to the analysis tool only by the data communication function included in the expanded specific file.

6. A vehicle onboard apparatus comprising:
    an analysis tool connection portion to which an analysis tool that analyzes logs and data is connectable;
    a recording medium connection portion to which a recording medium is connectable; and
    a microcomputer having a general-purpose operating system function capable of activating a data communication function that transfers the logs and the data stored in an application function to the analysis tool,
    wherein:
    the vehicle onboard apparatus comprises
        a connection detection function that detects connection of the recording medium to the recording medium connection portion, and
        a disconnection detection function that detects the disconnection of the recording medium from the recording medium connection portion;
    when the connection detection function detects the connection of the recording medium to the recording medium connection portion and determines that a first specific file is stored in the recording medium, the connection detection function acquires a second specific file protected by a password from an external server, expands the second specific file acquired by using a predefined password, copies the data communication function included in the expanded specific file to a specific area of the general-purpose operating system function, and activates the data communication function; and
    when the disconnection detection function detects the disconnection of the recording medium from the recording medium connection portion and determines that the data communication function is activated, the disconnection detection function stops the data communication function activated and deletes the data communication function from the general-purpose operating system function.

7. The vehicle onboard apparatus according to claim 6, wherein:
    the recording medium connection portion includes a USB connection portion to which a USB memory as the recording medium is connectable.

8. The vehicle onboard apparatus according to claim 6, wherein:
    the recording medium connection portion includes a disk-type recording medium connection portion to which a disk-type recording medium as the recording medium is connectable.

9. The vehicle onboard apparatus according to claim 6, wherein:
    the vehicle onboard apparatus is attached to a vehicle in an unremovable manner.

10. The vehicle onboard apparatus according to claim 6, wherein:
    the general-purpose operating system function is configured to transfer the logs and the data to the analysis tool only by the data communication function included in the expanded specific file.

11. A computer readable non-transitory storage medium that stores a computer program for a microcomputer of a vehicle onboard apparatus,
the vehicle onboard apparatus including:
an analysis tool connection portion to which an analysis tool that analyzes logs and data is connectable;
a recording medium connection portion to which a recording medium is connectable; and
a microcomputer having a general-purpose operating system function capable of activating a data communication function that transfers the logs and the data stored in an application function to the analysis tool,
the computer program causing the microcomputer to perform steps comprising:
a storage determination step determining whether a specific file protected by a password is stored in the recording medium when connection of the recording medium to the recording medium connection portion is detected;
an expansion step expanding the specific file by using a predefined password when the storage determination step determines that the specific file is stored;
a copying step copying the data communication function included in the expanded specific file to a specific area of the general-purpose operating system function;
an activation step activating the data communication function;
an activation determination step determining whether the data communication function is activated when disconnection of the recording medium from the recording medium connection portion is detected;
a stopping step stopping the data communication function activated when the activation determination step determines that the data communication function is activated; and
a deletion step deleting the data communication function from the general-purpose operating system function.

12. A computer readable non-transitory storage medium that stores a computer program for a microcomputer of a vehicle onboard apparatus,
the vehicle onboard apparatus including:
an analysis tool connection portion to which an analysis tool that analyzes logs and data is connectable;
a recording medium connection portion to which a recording medium is connectable; and
a microcomputer having a general-purpose operating system function capable of activating a data communication function that transfers the logs and the data stored in an application function to the analysis tool,
the computer program causing the microcomputer to perform steps comprising:
a storage determination step determining whether a first specific file is stored in the recording medium when connection of the recording medium to the recording medium connection portion is detected;
an acquisition step acquiring from an external server a second specific file protected by a password when the storage determination step determines that the first specific file is stored;
an expansion step expanding the second specific file acquired by using a predefined password;
a copying step copying the data communication function included in the expanded specific file to a specific area of the general-purpose operating system function;
an activation step activating the data communication function;
an activation determination step determining whether the data communication function is activated when disconnection of the recording medium from the recording medium connection portion is detected;
a stopping step stopping the data communication function activated when the activation determination step determines that the data communication function is activated; and
a file deletion step deleting the data communication function from the general-purpose operating system function.

* * * * *